Feb. 16, 1926. 1,573,041
W. DAVIES
COOKING APPARATUS
Filed Feb. 10, 1925 3 Sheets-Sheet 1
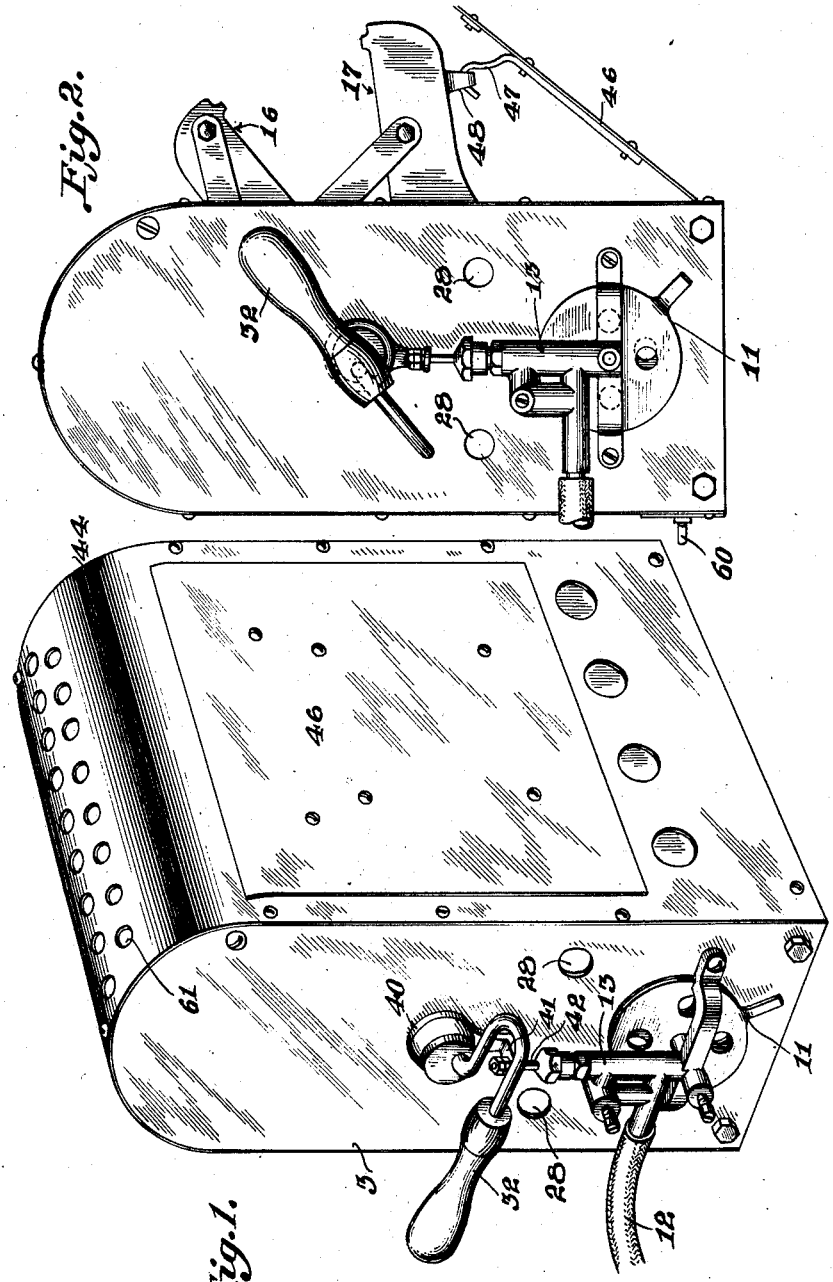
Inventor
Wayne Davies

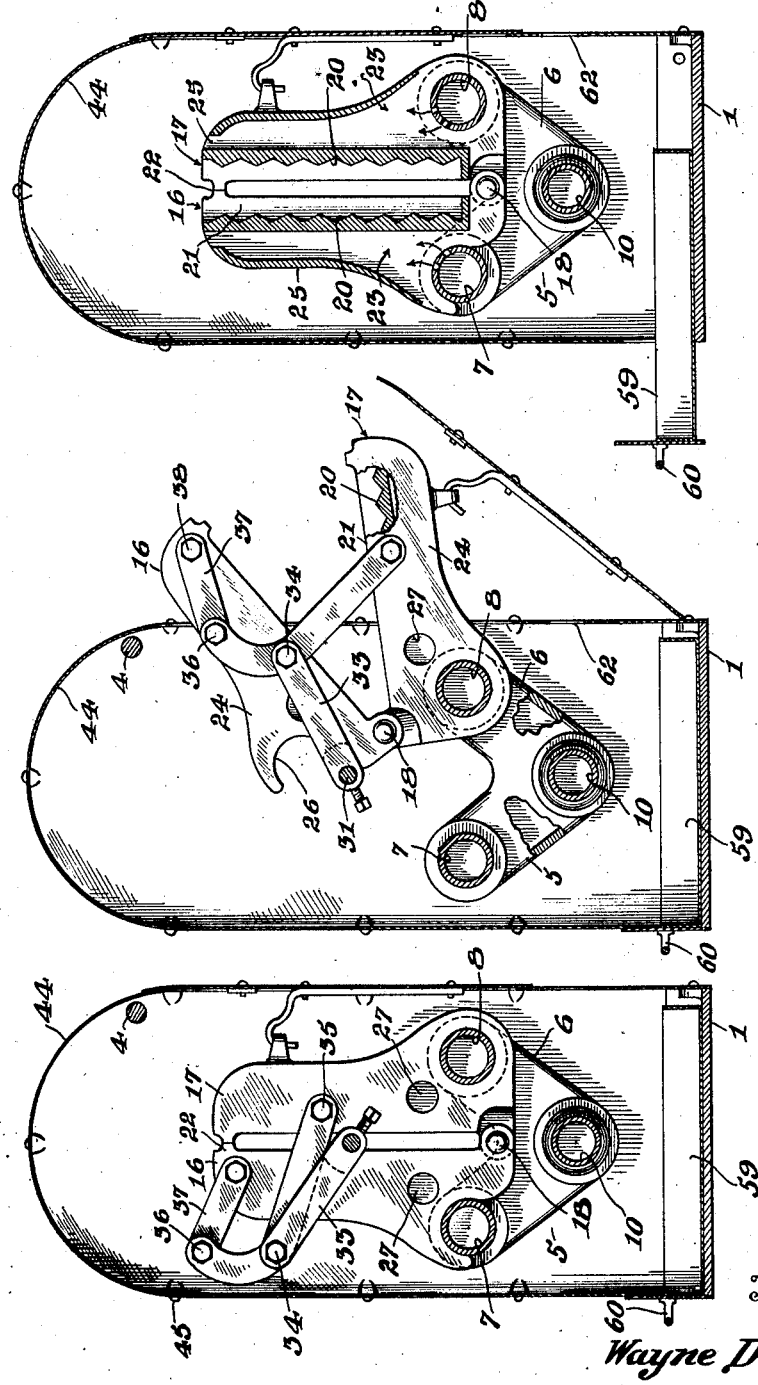

Feb. 16, 1926. 1,573,041
W. DAVIES
COOKING APPARATUS
Filed Feb. 10, 1925 3 Sheets-Sheet 3
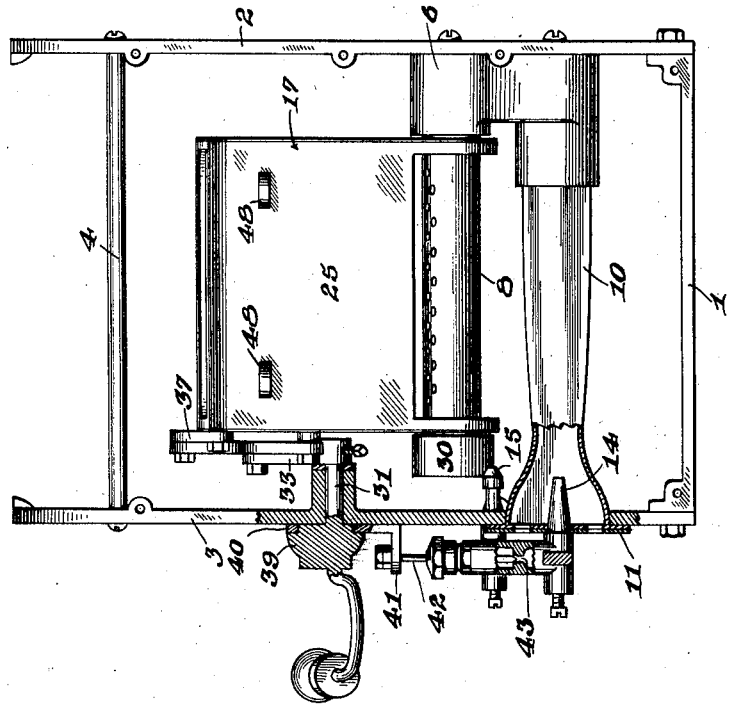
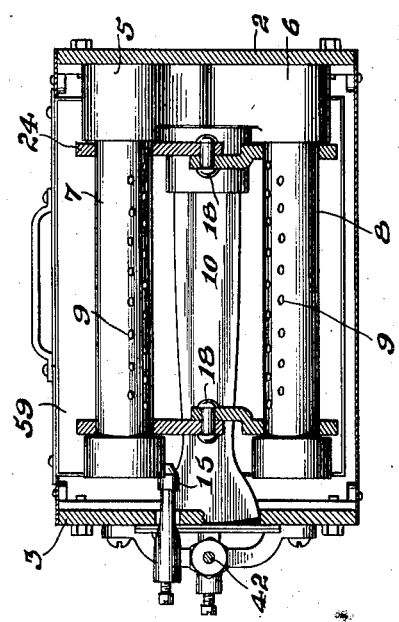
Inventor
Wayne Davies
By Mason Fenwick&Lawrence
Attorneys Patented Feb. 16, 1926.

1,573,041

UNITED STATES PATENT OFFICE.

WAYNE DAVIES, OF ATLANTA, GEORGIA.

COOKING APPARATUS.

Application filed February 10, 1925. Serial No. 8,288.

*To all whom it may concern:*

Be it known that I, WAYNE DAVIES, a citizen of the United States, residing at Atlanta, in the county of Fulton and State of Georgia, have invented certain new and useful Improvements in Cooking Apparatus; and I do hereby declare the following to be a full, clear, and exact description of the invention, such as will enable others skilled in the art to which it appertains to make and use the same.

This invention relates to cooking apparatus, and more particularly to an apparatus adapted for toasting sandwiches.

It is an object of the invention to provide a toaster for sandwiches which shall be simple and compact in construction and suitable for use at lunch counters and like places where food is dispensed.

The various features of novelty and invention will appear from the detailed description taken in connection with the accompanying drawings forming part of the specification.

Referring to the drawings:

Fig. 1 is a perspective view of the improved cooking apparatus, the toasting elements being contained within the housing.

Fig. 2 is an end view of the apparatus shown in Fig. 1, and showing the position assumed by the toasting elements when the same are in position to receive the sandwich to be toasted.

Fig. 3 is a vertical section through the cooking apparatus showing the toasting elements in closed position.

Fig. 4 is a view similar to Fig. 3 showing the position assumed by the toasting elements when the same are in position to receive the sandwich or other article of food to be cooked.

Fig. 5 is a vertical section through the toasting elements when in the position shown in Fig. 3.

Fig. 6 is a horizontal section through the cooking apparatus on a plane above the gas burner pipes.

Fig. 7 is a side view of the apparatus, partly in section, with the housing or cover removed.

The frame of the apparatus comprises a base 1 and side walls 2 and 3 braced at their upper ends by a tie rod 4. Secured to the wall 2 is a gas manifold having upwardly diverging branches 5 and 6, one branch having a horizontally disposed burner pipe 7, and the other a similarly disposed burner pipe 8, both pipes being provided along their upper surfaces with perforations 9 through which jets of gas issue. Gas is supplied to the manifold by means of the supply pipe 10 which extends through the wall 3 and is suitably enlarged at that point to provide a mixing chamber for air and gas, as will be readily understood. The admission of air to the supply or mixing pipe 10 is controlled by the usual flat circular valve 11, and gas is supplied thereto from a suitable source of supply 12 through a valve generally indicated at 13, said valve having a nozzle 14 extending into the mouth of the mixing pipe 10. A pilot light nozzle 15 extends from the valve 13 into such proximity with the burners 7 and 8 that the same will be lighted when the gas is turned on as will be readily understood.

The heating or toasting elements are generally indicated by numerals 16 and 17 and are substantially duplicates in essential parts. They are hinged together as at 18 so that they may be opened in a V-position, as indicated in Figs. 2 and 4. The heating element 17 is turnably or pivotally mounted on the burner pipe 8 and is adapted to be swung thereon from an upright position as indicated in Fig. 3 to substantially horizontal position as indicated in Fig. 4. Each of the heating elements 16 and 17 has a heating face or plate 20 preferably provided with pyramidal projections somewhat in the nature of a waffle iron, so that when the sandwich is placed between the heating plates the said projections will be forced into the bread somewhat. By providing a pyramidal surface for the plates instead of a plane surface, a greater heating surface will be applied to the sandwich and thus enables the same to be more thoroughly warmed and toasted than could otherwise be done, as will be readily understood. Each face 20 is flanked by a peripheral flange 21 except at the top of the plate. When the heating irons are closed, a pocket or oven is formed between the faces 20, as will be readily understood by reference to Figs. 3 and 5, the flanges 21 contacting with each other only at the tops of the heating elements, as indicated at 22, there being otherwise a clear space between the flanges and the respective heating elements. The heating plates 20 are adapted to be heated by hot gases passing from the burners 7 and 8, respectively, up through a chamber 23 formed on the back of each plate. Each chamber extends the full width of the heating plate, being constituted by the side walls 24 of the heating elements and a connecting wall 25, the chamber being such that it flares downwardly and outwardly in the nature of a hood to overlie the burners 7 and 8, respectively. It will now be seen that the burner 8 passes through the side walls 24 of the heating element 17 and that the hot gases issuing from the burner 8 pass upwardly into the overlying chamber and out through the opening 25 at the top of the chamber. The chamber for the heating element 17 as well as the heating element 16 is open at its bottom to permit air to mix with the burning gases as they issue from the burners. As previously indicated, the heating elements 16 and 17 are hinged together as at 18. The heating element 16 is not pivoted on the burner 7 but is adapted to rest thereon when the same is in upright position, as clearly indicated in Figs. 3 and 5. In order to form a suitable seat between the burners 7 and the heating element 16, the side walls at the bottom of the chamber are cut out as indicated at 26. One of the side walls 24 of each of the heating elements may be provided with an opening 27 to enable the operator to light the gas and to see how the burners are operating, there being a corresponding opening 28 in the adjacent wall 3 of the frame. In the present instance, the burners 7 and 8 are shown provided with caps 29 at their ends.

The mechanism for turning the heating element 17 on its pivot and for opening the heating elements into V-position will now be described. Turnably mounted in the wall 3 is a shaft 31 which is adapted to be turned by any suitable handle 32 and affixed on the inner end of the shaft is a crank 33, the free end of which is pivotally connected as at 34 to an elbow lever one end of which is connected as at 35 to the heating element 17, the other end of the same extending upwardly above the top of the heating elements, and being pivotally connected as at 36 to a link 37 which at its other end is connected to the adjacent heating element as indicated at 38. The link, lever, and crank are so arranged with respect to each other and the heating elements that as the crank is turned in a clockwise direction, as viewed in the drawings, the heating element 17 will be swung to substantially horizontal position about its pivot, and at the same time both heating elements will be opened book-fashion to V-position, as shown in Fig. 4. The arrangement is further such that as the final limit of opening movement is reached the parts come to rest with a cushion-like effect due to the fact that as the angle between the plate 37 and the upstanding arm of the elbow lever increases, the weight of the heating element 16 tends to counterbalance or oppose the leverage action of the turning mechanism.

Means are provided for shutting off the flow of gases to the burners 7 and 8 when the heating elements are swung to open position, and for this purpose the shaft 31 is provided with an eccentric 39 which cooperates with a strap 40 having an annular extension 41 through which passes a valve stem 42, said valve stem entering the valve body 13 and controls the flow of gases through the supply port 43 as indicated in Fig. 7.

The apparatus is covered by a housing 44 secured to the upright walls 3 in any suitable manner as by screws 45. The front of the housing is provided with an opening which is adapted to be closed by a closure plate 46. This closure plate is hung on the heating element 17 by means of a hook 47 which enters the eyes 48 on the back of the same, the arrangement being such that when the heating elements are swung outwardly as indicated in Fig. 2 the closure or the cover plate will be moved away from the opening and be suspended from the heating element, and when the heating elements are swung into the housing, the closure plate will be drawn against the opening to close the same, as clearly indicated in the drawings.

For catching the drippings, and so forth, from the article to be toasted or cooked, there is provided a removable pan 59 which may be drawn out through the housing as will be readily understood by reference to Figs. 3, 4, and 5, by means of the handle 60 attached to the pan.

The housing is provided with a plurality of openings 61 at its top to permit the escape of the gases as they pass out through the tops of the chambers at the backs of the heating elements.

Other openings 62 are provided in the lower part of the housing to permit the entrance of air into the apparatus as may be required by the burners.

In will now be seen that there has been provided a cooking apparatus which is simple and sturdy in construction well adapted for the purpose for which it is designed. By reason of the fact that the heated gases from the burners pass upwardly through the chambers at the backs of the heating faces, the latter will be effectually heated for the purpose in view, the heating value of the hot gases being utilized to the greatest possible advantage.

The construction has been described with considerable particularity of detail, but it will be obvious to those skilled in the art that various changes in construction may be resorted to without departure from the spirit of the invention.

What I claim is:

1. The combination of a pair of oppositely disposed and mutually hinged heating plates, a support on which one of said plates is pivotally mounted, means for swinging the pivotally mounted plate, and means for opening said plates book-fashion as the pivotally mounted plate is swung on its pivot.

2. The combination of a pair of oppositely disposed and mutually hinged heating plates normally disposed in upright position, a support on which one of said plates is pivotally mounted, means for turning the plates on their hinge to open them for the reception of the article to be heated, and means coacting with said means to swing the pivoted plate on its pivot.

3. The combination of a pair of oppositely disposed and mutually hinged heating plates normally disposed in upright position, a support on which one of said plates is pivotally mounted, means for turning one of the plates on its support and at the same time turning both plates on their hinge, comprising a crank, a lever pivoted intermediate its ends to the crank, one end of said lever being pivoted to the pivoted plate, and a link pivoted at one end to the other of said plates and at its other end to the free end of the lever.

4. In combination, a pair of heating plates hinged together to permit the same to be turned into V-position, a support on which one of said plates is turnably mounted on an axis parallel to that of the hinge of the plates, means for holding the plates in upright closed position, means for swinging both plates in unison about the pivotal support of the one plate, and means for opening the plates into V-position during the said swinging movement comprising an elbow lever pivoted to the pivoted plate and of a length to position the elbow of the lever beyond the other plate when both plates are in upright position, a crank pivoted to the lever at the elbow thereof, means for turning the crank, that arm of the lever beyond the crank pivot extending upwardly and terminating at a point above the adjacent plate, and a link pivoted to the end of said upstanding arm, and connected at its other end to the adjacent plate.

5. The combination of a pair of oppositely disposed and mutually hinged heating plates normally disposed in upright position, each of said plates having a chamber at its back through which hot gases may pass upwardly, a support on which one of the plates is pivotally mounted, means for swinging the pivoted plate on its pivot and both plates with respect to each other to open them into V-position for the reception of the article to be heated, and means for supplying a heated medium to the said chamber when the plates are in normally closed position.

6. The combination specified in claim 5, the means for supplying hot gases comprising burner pipes, one below each of the said chambers.

7. In combination, a pair of spaced parallelly disposed burner pipes, a heating plate pivotally mounted on one of said pipes, a second heating plate hinged at its lower edge to the lower edge of the other said plate, each of said plates having a chamber on its back through which hot gases from the individual burner pipes may pass, and means for turning the pivoted plate about its support and at the same time swinging the plates on their hinge to open them into V-position 8. In combination, a pair of spaced parallelly disposed burner pipes, a heating plate pivotally mounted on one of said pipes, a chamber on the back of said plate through which hot gases from the burner may pass, means for swinging said plate on its pivot, a second heating plate with a chamber on its back normally disposed over the second burner pipe whereby the hot gases issuing therefrom will pass upwardly through the chamber, both plates being hinged together at their bottoms, and means interconnecting both plates whereby when the pivoted plate is moved the other will be turned on the hinge to cause the plates to include an acute angle between their adjacent faces.

9. In combination, a pair of spaced horizontal burners, a common gas supply pipe for the burners, a pilot extending toward the said burners, a valved member for controlling the flow of gas to the supply pipe, a pair of upright spaced heating plates, each having a chamber adapted to be positioned over said burners whereby the hot gases may pass upwardly through the chambers and heat the faces of the plates, means hingedly connecting said plates, and means for swinging both of said plates bodily about one of said burners as an axis and at the same time causing said plates to open into V-position, and means controlled by the last-named means for shutting off the flow of gas into the said supply pipe when the plates are swung in V-position.

10. In combination, a pair of spaced upright side walls forming a support, a pair of burners extending between said walls, a heating plate pivotally supported on one of said burners and having a chamber along one side through which the hot gases from the adjacent burner may pass upwardly to heat the face of the plate, a second chamber-provided plate disposed alongside the other plate and hinged to the latter to permit the plates to be opened book-fashion, means for swinging the pivoted plate on its support and at the same time opening the plates book-fashion into V-position, a hood disposed over and between the said walls, said hood having an opening in one side through which the heating plates may project when swung into V-position, and a closure for said opening carried by said pivoted plate.

11. In combination, a pair of heating elements arranged face to face in spaced relation, the back of each element having a chamber, each chamber being open at the top and bottom to permit the free upward passage of hot gases and flaring outwardly from the top down, means hingedly connecting said elements to permit them to be opened book-fashion into V-position, a burner over which the heating elements are disposed to permit the free upward passage of hot gases through the said chambers, and means for bodily moving one of said heating elements away from its burner and at the same time causing both elements to assume an acute angle between them for the reception or removal of an article therebetween.

12. The combination specified in claim 11, and one of said heating elements being pivotally mounted on its underlying burner.

13. A cooking device comprising a supported burner tube, a hollow casting rotatably mounted thereon and having communication therewith, a pair of hollow hingeably connected cooking elements adapted to receive the food to be cooked therebetween, one of which is pivotally supported on the casting, such cooking elements being in communication with the hollow casting, and means for swinging the cooking units to an angular position with respect to the casting, when it is desired to remove the food from the units.

14. A cooking device comprising a supported burner tube, a hollow casting rotatably mounted thereon and having communication therewith, a pair of hollow hingeably connected cooking elements adapted to receive the food to be cooked therebetween, one of which is pivotally supported on the casting, such cooking elements being in communication with the hollow casting, and means for swinging the cooking units to an angular position with respect to the casting, when it is desired to remove the food from the units, and means for moving one of the cooking elements away from the other, incident to the pivotal movement of one of the cooking elements on the casting.

15. In a cooking apparatus, a hollow supported casting adapted to have communication with a source of heat, a pair of co-acting hollow hingeably connected cooking elements having communication with the casting, one of which is pivotally connected therewith, and the other normally engaging the casting and supported by the latter, and means for swinging the cooking elements to a position to one side of the casting to permit the food to be removed.

16. A cooking apparatus comprising a pair of parallel burner tubes, a pair of hollow cooking elements hingeably connected together, one of which is pivotally supported on one of the burner tubes, the other cooking element having a longitudinal seat in its lower end which conforms to and normally rests upon the other burner tube, means for swinging the cooking elements to a position to one side of such burner tubes, and means for separating the cooking elements during the swinging operation.

In testimony whereof I affix my signature.

WAYNE DAVIES.